United States Patent [19]

Kosugi

[11] Patent Number: 5,673,349

[45] Date of Patent: Sep. 30, 1997

[54] SEMICONDUCTOR LASER MODULE

[75] Inventor: Tomonari Kosugi, Tokyo, Japan

[73] Assignee: NEC Corporation, Japan

[21] Appl. No.: 674,246

[22] Filed: Jul. 1, 1996

[30] Foreign Application Priority Data

Jul. 7, 1995 [JP] Japan ................................. 7-171248

[51] Int. Cl.$^6$ ....................................................... G02B 6/42
[52] U.S. Cl. ................................................ 385/92; 385/94
[58] Field of Search ................................ 385/88, 92, 94

[56] References Cited

U.S. PATENT DOCUMENTS 4,752,109  6/1988  Gordon et al. ............................ 385/94

FOREIGN PATENT DOCUMENTS

| 259018 | 3/1988 | European Pat. Off. . | |
| 3048535 | 7/1982 | Germany . | |
| 3902579 | 8/1989 | Germany . | |
| 4-356989 | 12/1992 | Japan . | |
| 5-281442 | 10/1993 | Japan ........................................ | 385/92 |

OTHER PUBLICATIONS

*Patent Abstracts of Japan*, vol. 017, No. 223, (E-1359), 7 May 1993 & JP-A-04 356989, Dec. 10, 1992.

Primary Examiner—Rodney B. Bovernick
Assistant Examiner—Ellen Eunjoo Kang

[57] ABSTRACT

A semiconductor laser module is described in which the vicinity of one end of optical fiber 22 is fixed to one side wall of the semiconductor laser module 20, an electronic cooling element 23 is secured to the interior bottom surface of a module package 21, and a substrate 24 composed of a metal plate having a two-level construction in which the upper-level portion 24U and the lower-level portion 24D have a level difference h, the upper surface of the electronic cooling element 23 being secured to the lower surface of upper-level portion 24U, a semiconductor laser 25 being secured to the end portion of the upper surface of upper-level portion 24U, and a lens 26 being mounted on the upper surface of lower-level portion 24D of the substrate; whereby the overall height occupied by all components is reduced by the level difference h as compared with a semiconductor laser module in which the lower surface of the substrate is a single plane.

4 Claims, 1 Drawing Sheet

SEMICONDUCTOR LASER MODULE

BACKGROUND OF THE INVENTION

1. Field of the Invention

The present invention relates to a semiconductor laser module used in, for example, optical communication or optical information processing, and in particular, to a semiconductor laser module in which an optical beam emitted from a semiconductor laser is coupled to an optical fiber and the temperature of the semiconductor laser is regulated by a cooling element.

2. Description of the Related Art

Semiconductor laser modules are widely used as signal light sources used in optical fiber transmission devices. Advances in the miniaturization of transmission devices employing optical fiber necessitate circuit boards of higher integration. Moreover, each type of component incorporated into a circuit board is miniaturized and has a lower-profile structure, thereby creating a demand for semiconductor laser modules which are also of thinner construction.

FIG. 1 shows the schematic structure of a semiconductor laser module of the prior art. One end of an optical fiber 12 for transmitting optical signals is accommodated on one side wall of module package 11 of semiconductor laser module 10. Electronic cooling element 13 is disposed on the interior bottom surface of module package 11, and on top of this element, interposed by substrate 14, are arranged semiconductor laser 15 and lens 16 for optically coupling a light beam emitted by semiconductor laser 15 with optical fiber 12.

In this semiconductor laser module 10, the following measures are taken to reduce the height of module package 11 to a minimum. The height of electronic cooling element 13 has been suppressed to the minimum capable of providing a prescribed cooling power. The portion of substrate 14 arranged on cooling element 13 for mounting lens 16 is processed to a minimum thickness. The portion in which semiconductor laser 15 is mounted is set to a height such that the laser beam coincides with the optical axis of lens 16. The height of module package 11 can be reduced to the extent that the diameter of lens 16 is decreased, but because a prescribed numerical aperture (NA) must be maintained, the diameter is therefore set to the smallest aperture that meets this requirement.

In the construction of such a semiconductor laser module of the prior art, the portion of substrate 14 for accommodating lens 16 is made as thin as possible in order to reduce the overall height of interior components to the minimum. However, the overall height occupied by the components (chip-on-carrier) such as electronic cooling element 13 and substrate 14 and semiconductor laser 15 disposed upon electronic cooling element 13 is theoretically cannot be made less than, sum of height of electronic cooling element 13 and the diameter of lens 16 even if, for example, the thickness of substrate 14 is set to processing limits.

A specific example of the above-described construction is described in Japanese Patent Laid-open No. 356989/92.

SUMMARY OF THE INVENTION

The object of the present invention is to provide a semiconductor laser module in which the overall height occupied by components within a package can be reduced through the disposition of these components.

Another object of the present invention is to provide a semiconductor laser module in which the overall height of components can be made less than the sum of the height of the cooling element and the diameter of the lens.

According to the invention described in claim 1, a semiconductor laser module is provided with: (1) a module package of a prescribed shape; (2) a substrate of good heat conductivity composed of a step portion, an upper-level portion which is a flat plate arranged perpendicular to the upper portion of one side wall surface of the step portion, and a lower-level portion which is a flat plate arranged perpendicular to the lower portion of the opposite side wall surface of the step portion; (3) a temperature regulation element for regulating temperature having its lower surface secured to the interior bottom surface of the module package and having its upper surface secured to the lower surface of the upper-level portion of the substrate; (4) a semiconductor laser that emits a laser light and that is disposed in the vicinity of one end of the upper-level portion of the substrate; (5) an optical fiber having one end secured at the level of the side-wall portion of the module package which is irradiated by the laser light; and (6) a lens arranged on the upper surface of the lower-level portion of the substrate which optically couples the semiconductor laser and optical fiber.

In other words, according to the invention as described in claim 1, a substrate, which is disposed on a temperature regulation element such as a Peltier element for regulating temperature, is constructed from an upper-level portion, a lower-level portion, and a step portion that connects these two portions, the lower surface of the upper-level portion being secured to the upper surface of the temperature regulation element such that the lower-level portion aligns with the temperature regulation element. The lower-level portion is thus arranged in a lower position than the upper-level portion by means of the step portion, and by arranging the semiconductor laser on the upper-level portion and the lens on the lower-level portion, the height from the bottom surface of the module package to the top surface of the lens can be reduced from that of the prior art.

The invention as described in claim 2 is characterized in that the level difference between the upper-level portion and the lower-level portion is set such that the upper surface of the lower-level portion of the substrate is lower than the upper surface of the temperature regulation element. If the level difference is made relatively large, the upper surface of the lower-level portion of the substrate can be made lower than the upper surface of the temperature regulation element. The height of such a semiconductor laser module can thus definitely be reduced from that of a module of the prior art. Of course, the upper surface of the lower-level portion of the substrate need not be lower than the upper surface of the temperature regulation element.

The invention as described in claim 3 is characterized in that the lower surface of the lower-level portion of the substrate is arranged in a non-contacting state at a prescribed spacing from the interior bottom surface of the module package. Heat is therefore not directly conducted between the substrate and the module package, thereby allowing effect utilization of heat energy as well as miniaturization of the temperature regulation element.

The invention as described in claim 4 is characterized in that the temperature regulation element is an electronic cooling element for electronically cooling the semiconductor laser. Of course, the invention is not limited to a cooling element, and according to necessity, allows combination with a heating element or the use of a heating element alone.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS:

The present invention will next be described in detail with respect to an embodiment.

Figure 1:
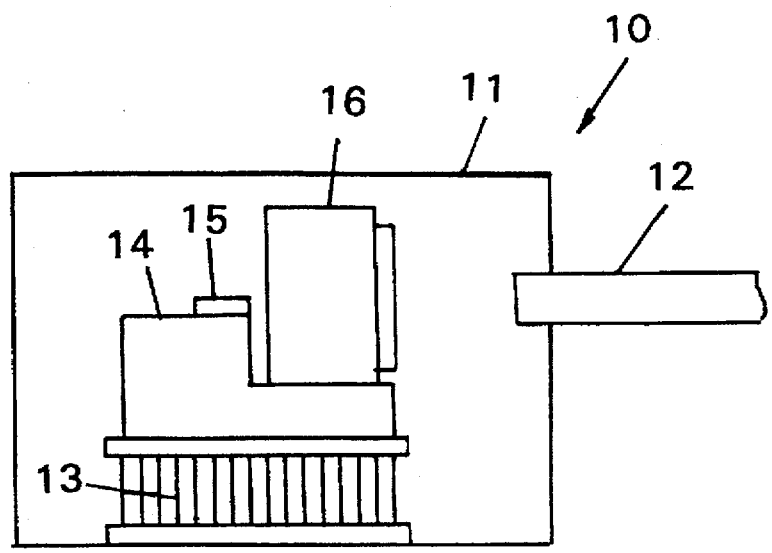
FIG. 1 is a schematic structural view showing the construction of a semiconductor laser module of the prior art.
Figure 2:
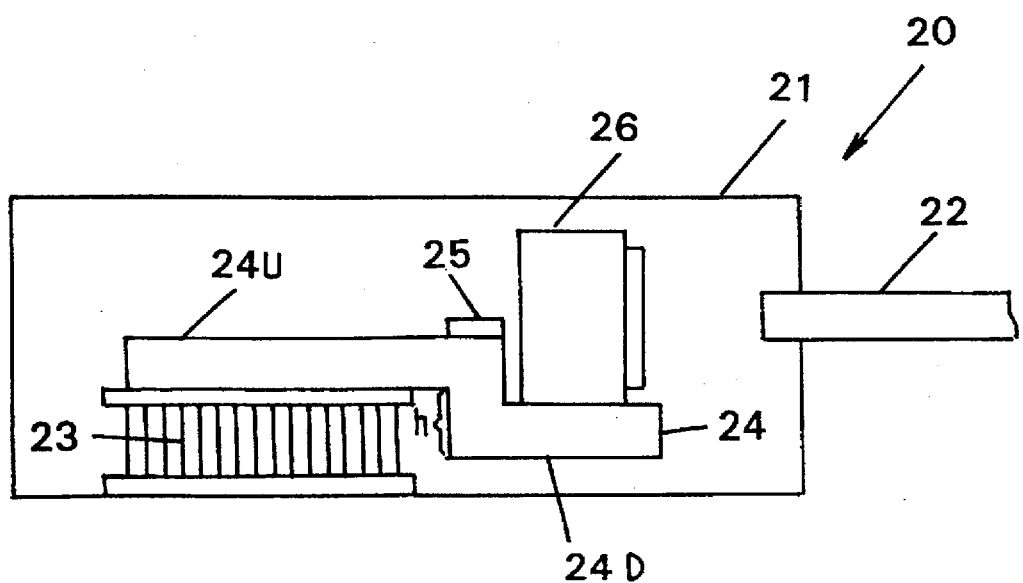
FIG. 2 is a schematic structural view showing the construction of a semiconductor laser module according to one embodiment of the present invention.

FIG. 2 shows the construction of a semiconductor laser module of one embodiment of the present invention. The semiconductor laser module 20 of this embodiment employs a somewhat long and narrow module package 21, the vicinity of one end of optical fiber 22 for transmitting optical signals being secured to one side wall of module package 21 by YAG (yttrium-aluminum-garnet) laser welding. Electronic cooling element 23 composed of a Peltier element is secured by solder to the interior bottom surface of module package 21. The upper-level portion 24U of substrate 24, which is composed of metallic plate structured in two levels with a prescribed level difference h, is secured by solder to the upper surface of electronic cooling element 23. Semiconductor laser 25 is secured by solder to the end of upper-level portion 24U which is closer to optical fiber 22. Optical fiber 22 is secured at a pre-set position such that its optical axis coincides with the height of the light-emitting portion of semiconductor laser 25. Lens 26 is secured by YAG laser welding to the upper surface of lower-level portion 24D of substrate 24. The level difference h of substrate 24 is set to a value such that the optical axes of this lens 26 and optical fiber 22 coincide. The bottom surface of lower-level portion 24D of substrate 24 is in a non-contacting state with the interior bottom surface of module package 21.

In a semiconductor laser module 20 constructed in this manner, semiconductor laser 25 and optical fiber 22 are optically coupled by means of lens 26. In addition, semiconductor laser 25 discharges heat through electronic cooling element 23 by way of substrate 24 so as to maintain semiconductor laser 25 within a prescribed temperature range.

Moreover, according to the semiconductor laser module 20 of this embodiment, a level difference h is provided in substrate 24, thereby allowing the height of the upper surface of lower-level portion 24D to be lower than the height of the upper surface of electronic cooling element 23. Accordingly, not only can the overall height of all components within module package 21 be made smaller than a value produced by merely adding the height of lens 26, the height of electronic cooling element 23 and the thickness of substrate 24, but by adjusting the height of electronic cooling element 23 and the set value of level difference h, the overall height can be further greatly reduced to a value less than a value produced by merely adding the height of electronic cooling element 23 and the diameter of lens 26. As a result, the invention allows a greater degree of freedom in selecting each type of component, such as electronic cooling element 23, while remaining within the range of permissible height for the overall height of the components, and furthermore, affords greater margins in performance and reliability of the components. As a matter of course, the height of the semiconductor laser module can be greatly improved by setting the height of each type of component at its limit.

In addition, although one semiconductor laser was arranged within the semiconductor laser module of the embodiment, the present invention may also be applied in a semiconductor laser module in which two or more semiconductor lasers are arranged as described in, for example Japanese Patent Laid-open No. 281442/93.

Furthermore, while one example of the shape of the lower-level portion of the substrate has been presented in the present embodiment, the shape and position of arrangement, and height of each type of component (chip-on-carrier) disposed on the temperature regulation element may be modified in various ways depending on the size or shape of the components.

According to the invention as described above in claim 1, the substrate arranged on the temperature regulation element is a construction made up of an upper-level portion, a lower-level portion, and a step portion connecting these two portions, and the lower surface of the upper-level portion is secured to the upper surface of the temperature regulation element such that the lower-level portion aligns with the temperature regulation element. The lower-level portion is thus arranged at a position lower than the upper-level portion by the amount of the level difference, and arranging the semiconductor laser on the upper-level portion and the lens on the lower-level portion allows a reduction of the height from the bottom surface of the module package to the top of the lens. This construction therefore affords an extra margin in the performance and size of each of the constituent components while reducing the height of the semiconductor laser module and contributing to the economy and compactness of the transmitter. In addition, by miniaturizing each individual constituent component, the semiconductor laser module can be made even more compact.

Furthermore, according to the invention as described in claim 2, the upper surface of the lower-level portion of the substrate can be made lower than the upper surface of the temperature regulation element by employing a relatively large level difference, and accordingly, the thickness of the substrate need not differ between the portion at which the lens is secured and the portion at which the semiconductor laser is secured. As a result, the invention has the advantage of allowing easy fabrication of the substrate by, for example, simply bending a flat plate.

Moreover, according to the invention as described in claim 3, the lower surface of the lower-level portion of the substrate is at a prescribed distance from, and in a non-contacting state with, the interior bottom surface of the module package. For this reason, heat is not directly conducted between the substrate and the module package, thereby allowing both efficient utilization of heat energy and miniaturization of the temperature regulation element.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A semiconductor laser module comprising:

a module package of a predescribed shape;

a substrate of good heat conductivity composed of a step portion, an upper-level portion which is a flat plate arranged perpendicular to an upper portion of one side wall surface of said step portion, and a lower-level portion which is a flat plate arranged perpendicular to a lower portion of an opposite side wall surface of said step portion so that a lower surface of said lower-level portion being lower than a lower surface of said upper-level portion;

a temperature regulation element for regulating temperature having its lower surface secured to an interior bottom surface of said module package and having its upper surface secured to the lower surface of said upper-level portion of said substrate;

a semiconductor laser that emits a laser light and that is disposed in the vicinity of one end of said upper-level portion of said substrate;

an optical fiber having one end secured at a level of a side-wall portion of said module package which is irradiated by said laser light; and a lens arranged on an upper surface of said lower-level portion of said substrate which optically couples said semiconductor laser and said optical fiber.

2. A semiconductor laser module according to claim 1 wherein a level difference between the lower surface of said upper-level portion and the lower surface of said lower-level portion is set such that the upper surface of said lower-level portion of said substrate is lower than an upper surface of said temperature regulation element.

3. A semiconductor laser module according to claim 1 wherein the lower surface of said lower-level portion of said substrate is arranged in a non-contacting state at a prescribed spacing from the interior bottom surface of said module package.

4. A semiconductor laser module according to claim 1 wherein said temperature regulation element is an electronic cooling element for electronically cooling said semiconductor laser.

* * * * *